US005433890A

United States Patent [19]

Meyer et al.

[11] Patent Number: 5,433,890
[45] Date of Patent: Jul. 18, 1995

[54] RUBBER AND POLYMER PRESERVATIVE AND PROTECTANT

[75] Inventors: Kenneth L. Meyer, Yorktown Heights, N.Y.; Edward T. Turner, Danbury, Conn.; Richard L. Wolstoncroft, Mount Kisco, N.Y.

[73] Assignee: First Brands Corporation, Danbury, Conn.

[21] Appl. No.: 277,125

[22] Filed: Jul. 19, 1994

Related U.S. Application Data

[63] Continuation of Ser. No. 596,269, Oct. 12, 1990, abandoned.

[51] Int. Cl.⁶ ............................ C09G 1/10; C09G 1/12
[52] U.S. Cl. ............................ 252/309; 252/380; 106/3; 106/9; 106/10; 106/287.11; 106/287.13; 106/287.16
[58] Field of Search ............................ 252/309, 380, 38; 106/3, 6, 287.11, 287.13, 287.16, 10; 427/355, 369

[56] References Cited

U.S. PATENT DOCUMENTS

| | | | |
|---|---|---|---|
| 2,955,047 | 10/1960 | Terry | 106/3 |
| 3,429,842 | 2/1969 | Wolstoncroft | 260/28.5 |
| 3,457,173 | 7/1969 | Pater | 252/46.3 |
| 3,527,723 | 9/1970 | Stroh et al. | 260/22 |
| 3,544,498 | 12/1970 | Holdstock et al. | 260/29.2 |
| 3,553,123 | 1/1971 | Behnke | 260/23 |
| 3,624,015 | 11/1971 | Vaughn et al. | 260/28.5 R |
| 3,801,572 | 4/1974 | Berger | 260/243 R |
| 3,817,889 | 6/1974 | Fink et al. | 260/28 |
| 3,956,174 | 5/1976 | Palcher | 252/400 R |
| 4,133,921 | 1/1979 | Palcher | 427/355 |
| 4,230,605 | 10/1980 | Connolly et al. | 252/548 |
| 4,246,029 | 1/1981 | Sanders, Jr. | 106/3 |
| 4,247,330 | 1/1981 | Sanders, Jr. | 106/3 |
| 4,273,584 | 6/1981 | D'Angelo et al. | 106/3 |
| 4,347,333 | 8/1982 | Lohr et al. | 524/269 |
| 4,462,828 | 7/1984 | Otsuki | 106/3 |
| 4,509,981 | 4/1985 | Sanders, Jr. et al. | 106/3 |
| 4,518,727 | 5/1985 | Traver | 524/35 |
| 4,525,502 | 6/1985 | Traver | 524/96 |
| 4,529,758 | 7/1985 | Traver | 524/43 |
| 4,592,934 | 6/1986 | Wolstoncroft | 427/355 |
| 4,600,436 | 7/1986 | Traver | 106/3 |
| 4,618,689 | 10/1986 | Traver | 556/425 |
| 4,661,577 | 4/1987 | Jo Lane et al. | 528/10 |
| 4,669,988 | 10/1987 | Traver | 556/425 |
| 4,705,704 | 11/1987 | Jo Lane et al. | 427/389.9 |
| 4,757,106 | 7/1988 | Mayer et al. | 524/262 |
| 4,784,844 | 11/1988 | Thimineur et al. | 424/65 |
| 4,837,261 | 6/1989 | Hampe et al. | 524/268 |
| 4,898,614 | 2/1990 | Halloran et al. | 106/3 |
| 4,936,914 | 6/1990 | Hurley et al. | 106/3 |

FOREIGN PATENT DOCUMENTS 1176828  10/1984  Canada ............................ 31/71

*Primary Examiner*—Gary L. Geist
*Assistant Examiner*—Valerie Fee
*Attorney, Agent, or Firm*—Gary L. Wamer

[57] ABSTRACT

An aqueous polymer preservative and protectant composition containing a silicone emulsion, an aminofunctional silicone emulsion, a film forming thickening agent and a polyol.

21 Claims, No Drawings

RUBBER AND POLYMER PRESERVATIVE AND PROTECTANT

This application is a Continuation of prior U.S. application Ser. No. 07/596,269 filed Oct. 12, 1990, abandoned.

FIELD OF THE INVENTION

The instant invention relates to an improved composition and method for the treatment of rubber, polymer and other surfaces.

BACKGROUND OF THE INVENTION

The use of protective surface compositions is well known in the prior art and is commercially demonstrated by the availability of various products sold under the trademarks SON-OF-A-GU ® (a trademark of First Brands Properties Inc.) and ARMOR ALL ® (a trademark of Armor All Products Corporation). The aforementioned products are well known as providing a silicone-oil based spray-on protectant to provide gloss (an asthetic appearance property) and a protectant film to rubber polymer, and other surfaces. Representative of the well known use of such protectant products is for use on automotive parts such as automobile tires, vinyl tops, vinyl dashboards, vinyl upholstery, rubber sealing strips, rubber and or polymer bumpers and the like and, also, their use on synthetic rubbers, wood, painted surfaces, leather and the like in the home.

The nature of such protectant compositions is generally known from the prior art. For example, the packaging for ARMOR ALL ® brand protectant lists U.S. Pat. Nos. 3,956,174 and 4,133,921 as covering the commercial product. U.S. Pat. No. 3,956,174 discloses a preservative composition consisting essentially of an emulsion of at least one water emulsifiable organopolysiloxane fluid having a viscosity of from about 100 to about 10,000 centistokes and, based on the weight of the polysiloxane fluid from about 65% to about 5,000% by weight of water: and from about 15% to about 65% by weight based on the weight of the polysiloxane fluid of at least one water miscible polyol compound. In addition, incorporation of diethylene glycol (as a polyol) and glycerin (as a polyol) are stated to be beneficial. In fact, claims 1, 2, 4 and 5 of U.S. Pat. No. 3,956,174 were disclaimed by the patentee whereby only a composition containing the aforementioned organopolysiloxane, diethylene glycol and glycerin is covered by U.S. Pat. No. 3,956,174. U.S. Pat. No. is a division of U.S. Pat. No. 3,956,174 and discloses the process of applying the organopolysiloxane/diethylene glycol/glycerin composition of U.S. Pat. No. 3,956,174 to a surface to preserve and renew the surface. U.S. Pat. No. 4,347,333 discloses an emulsion coating composition (emulsion) containing silicone fluids, a cleaning solvent, water, surfactant and an acrylic polymer which is soluble in the cleaning solvent. The cleaning solvent is present in an amount from about 5-65% by weight if the emulsion is an oil-in-water emulsion and from about 15-90% by weight if the emulsion is a water-in-oil emulsion. At column 3, line 22, to column 4, line 8 these required solvents are described as having good cleaning characteristics. Representative solvents are stated to include hydrocarbons and particularly isoparaffinic hydrocarbons, naphtha, Stoddard solvent, kerosene, turpentine, aliphatic hydrocarbons and cycloaliphatic hydrocarbons.

In addition to U.S. Pat. Nos. 3,956,174 and 4,133,921, the patent prior art discloses other preservative and/or coatings for rubber or vinyl surfaces. U.S. Pat. No. 3,527,723 discloses a coating composition containing about 0.55% to about 10 by weight emulsified organopolysiloxane oil and from 1% to about 20% by weight on an active resin basis of water reducible polyester resin having a set time of less than about 8 hours and a cure temperature from about 32 degree F. to about 120 degree F. and, optionally, a drying agent. Canadian Patent No. 1,176,828 discloses ultraviolet absorbent silicone based water emulsions for vinyl polishes comprising a polydimethylsiloxane oil or a blend of oils, sufficient water to form an aqueous continuous phase of said emulsion, an emulsifying agent and a silicon oil soluble ultraviolet light absorbing agent.

Although the preservative and treating compositions of the prior art have been useful in treating rubber and polymer surfaces, there is a continuing need for improving both the appearance and protection imparted by use of these products. The instant invention relates to a novel rubber and polymer preservative and protectant which provides long lasting gloss to treated surfaces and provides for improved abrasion protection over commercially available rubber and polymer preservatives and protectants.

SUMMARY OF THE INVENTION

The compositions for treating a surface of the instant invention comprise:

(i) a major amount of water:
(ii) an effective amount of a silicone emulsion containing a dialkylpolysiloxane emulsified in water:
(iii) an effective amount of an aminofunctional silicone emulsion containing an aminofunctional silicone emulsified in water:
(iv) an effective amount of a polyol;
(v) an effective amount of a film forming thickening agent;
(vi) optionally, an effective amount of anti-bacterial agent.

In a further embodiment the instant composition for treating a surface comprises concentrations for components (i) to (vi) are as follows:

(i) between about 20 and about 40 weight percent water;
(ii) between about 50 and about 60 weight percent silicone emulsion containing about 20 to about 40 weight percent dimethylpolysiloxane;
(iii) between about 0.5 and about 5 weight percent aminofunctional silicone emulsion containing 20 to 40 weight percent aminofunctional polysiloxane;
(iv) between about 2 and about 8 weight percent pf a polyol, preferably propylene glycol;
(v) between about 1 and about 5 weight percent acrylic copolymer emulsions containing between about 20 and about 40 weight percent acrylic copolymer and between about 0.1 and about 1 weight percent morpholine; and
(vi) optionally, between about 0.01 and about 1 weight percent of a mixture of water, 1, 2 benziosothiazolin 3-one and dipropylene glycol wherein the weight ratio of 1, 2 benziosothiazolin 3-one to dipropylene glycol is between about 1:10 and about 10:1.

In a further embodiment the instant composition for treating a surface comprising a rubber or a vinyl polymer and the concentrations of components (i) to (vi) are as follows:
- (i) between about 30 to about 35 weight percent water;
- (ii) between about 50 to about 60 weight percent silicone emulsion containing between about 20 to about 35 weight percent dimethylpolysiloxane;
- (iii) between about 1.0 and 2.0 weight percent aminofunctional silicone emulsion containing about 35 weight percent aminofunctional dimethylpolysiloxane.;
- (iv) between about 3 and about 7 weight percent propylene glycol;
- (v) between about 2 and about 4 weight percent acrylic copolymer emulsion containing between about 25 and about 40 weight percent acrylic copolymer and between about 0.3 and 0.5 morpholine; and
- (vi) optionally, between about 0.1 and about 0.3 of a mixture of 16 weight percent water, 19 weight percent 1,2 benziosothiazolin 3-one and 65 weight percent dipropylene glycol.

The compositions of the instant invention provide improved gloss and resistance to surface abrasion over commercial protectant compositions currently available and based upon the use of only dimethysiloxane fluids as the active protectant ingredient.

DETAILED DESCRIPTION OF THE INVENTION

The instant invention relates to novel preservative and protectant compositions for rubber and polymer surfaces. Such preservatives and protectants are widely used by consumers in both automotive and home applications to both improve the appearance of rubber, polymer, wood, leather, plexiglass, and similar surfaces and to provide a protective film for such surfaces.

The instant invention relates to a novel combination of chemical components which have been observed to provide surprising improvements in the gloss appearance of rubber and polymer surfaces and the ability of the treated surface to maintain the gloss. Further, the instant compositions have been observed to provide improved resistance to abrasion whereby the treated surface is protected from mild abrasive forces when effective amounts of the components are combined.

The instant compositions generally comprise:
- (i) a major amount of water;
- (ii) an effective amount of a silicone emulsion containing dimalkylpolysiloxane emulsified in water:
- (iii) an effective amount of an aminofunctional silicone emulsion, preferably containing an aminofunctional dimethylpolysiloxane.;
- (iv) an effective amount of a polyol;
- (v) an effective amount of a film forming thickening agent, preferably an acrylic copolymer emulsion containing an acrylic copolymer and morpholine: and
- (vi) optionally, an effective amount of a bactericide, preferably a mixture of 16 weight percent water, 19 weight percent 1.2 benziosothiazolin 3-one and 65 weight percent dipropylene glycol.

In a further embodiment the instant compositions for treating a surface have concentrations of components (i) to (vi) which are as follows:
- (i) between about 20 and about 40 weight percent water:
- (ii) between about 50 and about 60 weight percent silicone emulsion containing about 20 to about 40 weight percent dimethylpolysiloxane:
- (iii) between about 0.5 and about 5 weight percent aminofunctional silicone emulsion containing 20 to 40 weight percent aminofunctional polysiloxane;
- (iv) between about 2 and about 8 weight percent of a polyol, preferably propylene glycol;
- (v) between about land about 5 weight percent acrylic copolymer emulsion containing between about 20 and about 40 weight percent acrylic copolymer and between about 0.1 and about 1 weight percent morpholine; and
- (vi) optionally, a bactericide, preferably between about 0.01 and about 1 weight percent of a mixture of water, 1, 2 benziosothiazolin3-one and dipropylene glycol wherein the weight ratio of 1, 2 benziosothiazolin 3-one to dipropylene glycol is between about 1:10 and about 10:1.

In a further embodiment the instant compositions are especially beneficial for treating a surface which is rubber or a vinyl polymer and said concentrations of (i) to (vi) are as follows:
- (i) between about 30 to about 35 weight percent water:
- (ii) between about 55 and to about 60 weight percent silicone emulsion having 35 weight percent dimethylpolysiloxane;
- (iii) between about 1.0 and about 2.0 weight percent aminofunctional silicone emulsion having 35 weight percent aminofunctional dimethylpolysiloxane;
- (iv) between about 3 and about 7 weight percent propylene glycol;
- (v) between about 2 and about 4 weight percent acrylic copolymer emulsion containing between about 25 and about 35 crosslinked acrylic copolymers and between about 0.3 and about 0.5 weight percent morpholine; and
- (vi) between about 0.3 and about 0.5 weight percent of a mixture of 16 weight percent water, 19 weight percent 1.2 benziosothiazolin 3-one and 65 weight percent dipropylene glycol.

The silicone emulsion is an organopolysiloxane fluid and are commonly referred to in the art as silicone fluids. They comprise diaikylpolysiloxane fluids, generally dimethylpolysiloxane fluids of the general formula:

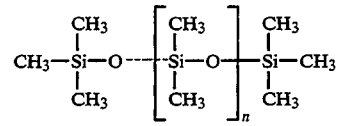

where n is the number of repeating units. The properties and commercial availability of such dimethylsilicones is well known in the art as evidenced in Table I (columns 3 and 4) and at column 4, line 32 to column 5, line 20 of U.S. Pat. No. 3,956,174 and column 3, line 45 to column 5, line 21 of U.S. Pat. No. 4,133,921, said referenced passages being incorporated herein by reference. Representative of such useful dimethylsilicone emulsions is an emulsion available under the trade designation UCC LE-46 which contains 35 percent by weight dimethylpolysiloxane emulsified in water. UCC LE-46 is available from Union Carbide Plastics and Chemicals Corporation, Danbury, Conn. Typical properties of UCC LE-46 are:

UCC LE-46 Typical Properties: 35 weight-percent dimethylpolysiloxane; Viscosity of contained oil at 25 degrees C.: 10,000 cSt; Emulsion System: Nonionic.

The aminofunctional silicone fluid is an emulsion of an aminofunctional silicone fluid emulsion and is preferably an aminofunctional dimethylpolysiloxane fluid. A description of such aminofunctional silicone fluid may be found at U.S. Pat. No. 3,801,572: U.S. Pat. No. 4,246,029, at column 2, line 41 to column 8, line 49; U.S. Pat. No. 4,247,330, at column 2, line 44 to column 7, line 24; U.S. Pat. No. 4,509,981 at column 3, line 24 to column 6, line 48; and U.S. Pat. No. 4,618,689:, such aforementioned passages of said patents incorporated by reference. A particularly useful aminofunctional silicone fluid emulsion is available from General Electric Corporation under the trade designation GE SM-2059 and contains 35 percent by weight aminofunctional dimethylpolysiloxane emulsified in water.

It has been observed that the combination of the silicone fluid emulsion (e.g., UCC LE-46) and the aminofunctional silicone fluid (e.g. GE SM-2059) provide benefits as to cost of manufacture, appearance enhancement (commonly referred to as "gloss") and abrasion protection not provided by preservative and protectant compositions containing only silicone fluid(s). The benefits of the instant combination of silicone fluid emulsion and aminofunctional silicone fluid emulsion derive from their ability to interact at the surface being treated to provide dual moieties for interaction with the treated surface and to act upon the surface for an extended period at the surface owing to high viscosity of the composition. The instant compositions provide numerous benefits to the surfaces they are employed to treat, including softening of vinyl and rubber surfaces, surface lubricity, surface gloss and resistance to wetting by water.

The aforementioned concentrations of silicone fluid and aminofunctional silicone fluid are given as weight percents of emulsions having a range of active silicone fluid or aminofunctional silicone fluid. It will be understood by those skilled in the art that the concentration of active silicone fluid or aminofunctional silicone fluid may be provided by employing emulsions having different amounts of silicone fluid or aminofunctional silicone fluid and such are included herein.

The instant composition additionally contains an effective amount of one or more polyols. The preferred polyol is 1,2- or 1,3- propylene glycols and mixtures thereof. Other representative polyols include: diethylene glycol: 1,4 - butylene glycol: 2,3-butylene glycol: 1,3 - butylene glycol: 1,2,6 - hexanetriol: dipropylene glycol: tetramethylene glycol: pentaerythritol: dipentene glycol: tetraethylene glycol: dimethyhexanediol: 2,2 - dimethyl - 1,3 - butanediol: dimethyloldioxane: tetraethylene glycol: ethylene glycol: liquid polyethylene glycols, and liquid polypropylene glycols.

The instant compositions also contains effective amounts of a film forming thickening agent such as an acrylic copolymer emulsion available from Rohm and Haas Company under the trade designation ACRYSOL ABE-60. Morpholine (tetrahydro 1,4 oxazine) is preferably added to the ACRYSOL ASE-60 and acts as a pH activating agent for the acrylic polymer and acts to form a water resistant film surface as the morpholine evaporates from the treated surface. Further, the film forming thickening agent provides an additional increase in the viscosity of the instant compositions to provide compositions having an effective viscosity between about 6000 and about 15,000 centistokes and preferably about 8,000 centistokes and about 12,000 centistokes. Compositions having a viscosity in the aforementioned range are typically referred to as lotions owing to their thickness and inability to be applied as a spray. The combination of ACRYSOL ASE-60 as the film forming thickening agent with morpholine as a pH activating agent for ACRYSOL ASE-60 has been observed to provide a novel film forming combination when employed in the instant compositions whereby the silicone fluid and aminofunctional silicone fluid have improved retention on the treated surface. Although the ACRYSOL ASE-60 emulsion is initially hydroscopic in nature, upon being combined with morpholine the resulting dried combination has an improved resistance to water over ACRYSOL ABE-60 alone, when both are compared as components of the instant compositions. ACRYSOL ABE-60 is generally characterized as containing 29 ($\pm 0.5$) weight percent crosslinked acrylic copolymer, a pH of 3.5, viscosity as 5 percent sodium salt of 25,000 cps and having a anionic colloidal charge.

The instant compositions beneficially contain an antibacterial agent to inhibit the attack of bacteria on the emulsifiers in the silicone fluid and aminofunctional silicone fluid. A particularly useful antibacterial agent is sold under the trade designation PROXEL GXL and comprises 19 percent by weight 1,2 benziosothiazolin 3-one, 65 percent by weight dipropylene glycol and 16 percent by weight water. Other known antibacterial agents (often referred to as "preservatives" or "biocides") may be employed, including GIVARD (dimethoxane).

In addition to the aforementioned components, the instant compositions may optionally contain effective amounts of known additives, including but not limited to: corrosion inhibitors; dyes; fragrances, ultraviolet light absorbers; antifoaming agents: antistatic agents; thickening agents (e.g., xanthan gum, cellulose, methylcellulose, pectin and the like). These optional components may be effectively added to modify the appearance, smell or provide an additional property to the composition by addition of an optional additive possessing a known performance property.

The pH of the instant compositions are typically between about 6.5 and about 9 and preferably are between about 7.5 and 8.5.

The process by which the instant compositions are employed are well known in the art. Simply stated the process involves applying, e.g., by wiping or otherwise physically applying the composition to a surface (preferably a previously cleaned surface), allowing the composition to be maintained in contact with the surface for an effective period of time for the composition to penetrate the surface. An effective time is typically less than two (2) hours with an effective treatment period between about 0.15 hours and about one (1) hour being typical. Although the benefits of the instant invention may be obtained with effective treatment times of less than two (2) hours, further benefits may often be obtained by employing longer treatment periods up to 24 hours. After the effective treatment period the treated surface is lightly rubbed with a soft cloth to remove excess composition. The treatment process may then be repeated, since it has been observed that additional treatments with the composition will result in the adherence of additional composition to the treated surface.

Surfaces treated with compositions according to this invention have a glossy appearance and have resistant to abrasion. Surfaces appropriate for treatment with the compositions of this invention include, but are not limited to, natural rubbers, synthetic rubbers and polymer materials such as vinyl polymers (such as vinylchloride polymers), polyester, polypropylene, woods, leathers, painted surfaces, plexiglass and the like.

EXAMPLES

The following examples are set forth to further exemplify the invention and are not intended to be limiting thereof:

Preparation of Instant Compositions for Examples 1, 2, 3 and 4

A composition according to the instant invention was prepared for use in the examples, having the following composition:

| COMPOSITION A* | |
|---|---|
| Component | Weight Percent |
| Water | 32.89 |
| Silicone Emulsion (UCC LE-46) | 57.00 |
| Aminofunctional Silicone Emulsion (GE SM2059) | 1.50 |
| Acrysol ASE 60 | 3.00 |
| Propylene Glycol | 5.00 |
| Morpholine | 0.45 |
| Proxel GXL** | 0.16 |

*Viscosity approximately 9000 centistokes with a pH of about 8.
** Added with UCC LE-46 silicone fluid emulsion.

Composition A is prepared by placing the ingredients in a thoroughly sanitized stainless steel tank by:

1. adding the water to the tank and commencing moderate stirring:
2. adding the Proxel GXL:
3. adding the silicone emulsion (UCC LE-46) and stirring for 20 minutes;
4. adding the propylene glycol:
5. adding the aminofunctional silicone fluid (GE SM2059):
6. adding the ACRYSOL ASE-60;
7. adding the morpholine; and then
8. increasing the stirring rate of product as it thickens to maintain movement at the edges of the tank without beating air into the product.

EXAMPLE 1:

A direct comparison between the preservative and protectant composition of this invention (hereinafter referred to as "Composition A") was made with a commercial rubber and vinyl preservative sold under the trademark ARMOR ALL and identified on its label as falling under the claims of U.S. Pat. No. 3,956,174 (claim 3 being the only patent claim) and U.S. Pat. No. 4,133,921. The comparative testing involved comparisons for appearance and abrasion durability for automotive exterior vinyl trim, automobile tires and automotive dashboards as follows:

I. AUTOMOTIVE VINYL TRIM TESTING:

Three automobiles were employed to evaluate the performance of Composition A as compared to ARMOR ALL brand rubber preservative and protectant. The ARMOR ALL sample was purchased at a commercial retail establishment. The two products were compared to determine their relative ability to provide gloss to exterior vinyl trim on each of the three test automobiles. Prior to treatment, the exterior vinyl trim on each car was washed with the same commercially available detergent car wash, rinsed and dried. A section of vinyl trim was selected at random and then taped so as to separate the trim into two sections with a two-inch trim section therebetween which is left untreated (control). Composition A is applied to first section of the exterior vinyl trim and ARMOR ALL is applied to the second section of the exterior vinyl trim. Each vinyl trim section was treated according to the same procedure by applying substantially the same amounts, by volume, to the area being treated by use of a soft cloth to remove any excess composition on the surface. After treatment the treated surfaces were left undisturbed for 2.5 hours and then wiped with a soft cloth. The tape was then removed from the exterior vinyl trim of each automobile and evaluated by three judges on the basis of gloss with each judge viewing the trim's gloss with the vinyl trim facing the sun. The treated surfaces were evaluated for three consecutive days to evaluate the long term affect of each composition on the treated surface in relation to the same environmental conditions. The third day of the evaluation included the condition of light intermittent rain.

The judges rated the gloss of each exterior vinyl trim sample by comparing each treated surface against the control surface and by assigning a numerical rating to each surface as follows:

| NUMERICAL RATING | EXPLANATION |
|---|---|
| 2 | Much better than Control |
| 1 | Better than Control |
| 0 | Equivalent to Control |
| −1 | Worse than Control |
| −2 | Much Worse than Control |

The resulting rating data was evaluated at a 95% confidence interval according to the method of analyses for measurement data as set forth in the National Bureau of Standards Handbook 91, Chapter 3, page 3–32, published 1966, incorporated herein by reference thereto. The results of the statistical analysis provided values for:

n—Number of data points
Σ—Sum of Values (Measurements or ratings)
X—Average sample of n measurements
S—Standard Deviation
$S^2$—Square of the Standard Deviation
u—Test Criterion As a result of this statistical analysis of the evaluation data, Composition A was determined to provide a statistically better gloss over the control and over ARMOR ALL under all test conditions, including after the light rain on day three of the test. Direct comparison of Composition A with the ARMOR ALL treated surface (as the control) gave the following comparison for Composition A:

| | EXTERIOR VINYL TRIM: Frequency of Rating: [1] | | |
|---|---|---|---|
| Rating | 1st Day | 2nd Day | 3rd Day |
| 2 | 1 | 7 | 11 |
| 1 | 20 | 16 | 14 |
| 0 | 8 | 7 | 9 |

|   |   |   |   |
|---|---|---|---|
| −1 | 4 | 4 | 1 |
| −2 | 3 | 2 | 1 |
| [1]Statistical Analysis: | | | |
| n | 36 | 36 | 36 |
| $\epsilon$ | 12 | 22 | 33 |
| $\overline{X}$ | 0.3333 | 0.6111 | 0.9167 |
| S | 1.0142 | 1.1027 | 0.9673 |
| $S^2$ | 1.0286 | 1.2159 | 0.9357 |
| Conclusion at 95% confidence level | Better than Control (ARMOR ALL) | Better than Control (ARMOR ALL) | Better than Control (ARMOR ALL) |

II. AUTOMOTIVE TIRES:

The test procedure employed for evaluation of exterior vinyl trim was repeated using at least four judges for automotive tire samples. Each tire was taped from top to bottom leaving a three inch section at the top and bottom between the two tapes so as to provide an area where the tire would not be treated with ARMOR ALL or Composition A. In each instance, all four tires on each of four automobiles were treated and evaluated. One of the four automobiles was treated a second time prior to evaluation to determine the effect of providing a second treatment of Composition A or ARMOR ALL. The cars and tires employed were:

| Car No. | Make | Year | Tires |
|---|---|---|---|
| 1 | Renault | 1983 | Michelin |
| 2 | Ford | 1986 | Michelin |
| 3 | Chevrolet | 1983 | Uniroyal |
| 4* | Pontiac | 1989 | Goodyear |

*Automobile receiving a second treatment

Each treated tire section was evaluated while facing the sun. The tires were evaluated for the same three days as the exterior vinyl trim evaluation of Part I. Direct comparison of the ARMOR ALL treated surface (as the control) and the composition treated surface gave the following comparison for Composition A:

|   | Frequency of Rating: | | |
|---|---|---|---|
| Rating | 1st Day | 2nd Day | 3rd Day |
| +2 | 3 | 1 | 12 |
| 1 | 36 | 43 | 27 |
| 0 | 17 | 29 | 44 |
| −1 | 39 | 23 | 13 |
| −2 | 1 | 0 | 0 |
| Statistical Analysis: | | | |
| n | 96 | 96 | 96 |
| $\epsilon$ | 1 | 22 | 38 |
| $\overline{X}$ | 0.0104 | 0.2292 | 0.3958 |
| S | 0.9787 | 0.8269 | 0.8763 |
| $S^2$ | 0.9578 | 1.6838 | 0.7680 |
| Conclusion at 95% confidence level | Equal to Control (ARMOR ALL) | Better than Control (ARMOR ALL) | Better than Control (ARMOR ALL) |

The above statistical evaluation of the test data demonstrates that the composition according to the instant invention provided both better initial appearance, i.e., "gloss", and better maintained gloss after the three day test period including after exposure to light rain.

III. INTERIOR VINYL (Dashboards):

The test procedure employed for evaluation of exterior vinyl trim was employed to evaluate interior vinyl trim, except twelve (12) cars were employed and each dashboard was taped to form two sections with a two inch section between them which was not treated (control). In addition, each tested composition was applied to six automobiles on the driver's side of the dashboard and to the passenger's side in the other six automobiles. The compositions were all permitted to remain undisturbed overnight prior to wiping the dashboard surface to remove excess composition. The automobiles treated and the area treated were as follows:

|   |   | COMPOSITION | |
|---|---|---|---|
| Automobile | Auto No. | Driver's Side[1] | Passenger Side[1] |
| Black 1989 Pontiac Grand Am | 1 | A | ARMOR ALL |
| Dark Blue 1989 Pontiac Grand Am | 2 | ARMOR ALL | A |
| Maroon 1989 Pontiac Grand Am | 3 | A | ARMOR ALL |
| Brown 1984 Chevrolet Citation | 4 | ARMOR ALL | A |
| Blue 1986 Ford Escort | 5 | A | ARMOR ALL |
| White 1983 Chevrolet Citation | 6 | A | ARMOR ALL |
| Blue 1985 Ford Escort | 7 | A | ARMOR ALL |
| Blue 1989 Oldsmobile Cutlass Salon | 8 | ARMOR ALL | A |
| Brown 1980 Toyota Corolla | 9 | ARMOR ALL | A |
| Blue 1988 Honda Acura | 10 | ARMOR ALL | A |
| Blue 1983 Renault Alliance | 11 | ARMOR ALL | A |
| White 1978 Plymouth Volare | 12 | A | ARMOR ALL |

[1]"A" means the Composition A according to the instant invention.

Each treated dashboard section was evaluated and the resulting data statistically evaluated according to the same procedure employed for the evaluation of exterior vinyl trim in Section I of this Example. Direct comparison of the ARMOR ALL treated surface (as the control) to the surface treated with Composition A gave the following comparison for Composition A:

|   | Frequency of Rating: | | |
|---|---|---|---|
| Rating | 1 Day | 4 Days | 13 Days |
| 2 | 2 | 6 | 10 |
| 1 | 21 | 18 | 20 |
| 0 | 7 | 9 | 2 |
| −1 | 6 | 3 | 1 |
| −2 | 0 | 0 | 0 |
| Statistical Analysis: | | | |
| n | 36 | 36 | 33 |
| $\epsilon$ | 19 | 27 | 39 |
| $\overline{X}$ | 0.5287 | 0.7500 | 1.1818 |
| S | 0.8447 | 0.8409 | 0.6826 |
| $S^2$ | 0.7135 | 0.7071 | 0.4659 |
| Conclusion at 95% confidence level | Better than Control (ARMOR ALL) | Better than Control (ARMOR ALL) | Better than Control (ARMOR ALL) |

The above results demonstrate that Composition A was significantly better than ARMOR ALL in providing gloss to the interior vinyl surfaces of the twelve automobiles.

EXAMPLE 2:

The two compositions (Composition A and ARMOR ALL) compared in Example 2 were compared as to their relative gloss appearance enhancement properties for sun exposed vinyl and for providing abrasion resistance enhancement for unexposed vinyl and rubber. The two compositions were blind as coded "Composition B" for the commercial ARMOR ALL composition and "Composition A" for the composition prepared according to the instant invention. The following tests were conducted:

I. TESTS CONDUCTED: SUMMARY OF TEST RESULTS

TEST 1:

Appearance (Gloss) Measurements on exposed Vinyl testing was conducted on exposed vinyl panels as described in Example 1. Statistical analysis of initial gloss readings before exposure show that at a 95% confidence level that Composition A provided better (higher) gloss than ARMOR ALL (Composition B) and better (higher) gloss than the untreated control. At the same time, the ARMOR ALL treated samples were not better than the average performance of the untreated control at a 95% confidence level.

Statistical analysis of gloss readings summarized at one, two and three weeks, at a 95% confidence level, demonstrated that Composition A provides a better (higher) gloss than ARMOR ALL (Composition B).

TEST 2:

Abrasion resistance of unexposed vinyl was evaluated over a two week period of exposure and the data summarized for one week test intervals. At each weekly interval there was a comparison to an untreated control, with a rating after abrasion and after abrasion/washing. Also at each weekly interval there is a data for direct comparisons after abrasion and after abrasion/after washing.

Statistical analysis at a 95% confidence level for each of the test conditions demonstrate that Composition A provided better abrasion resistance on unexposed vinyl than ARMOR ALL (Composition B).

TEST 3:

Abrasion resistance of exposed vinyl was evaluated over a two week period of exposure and the data summarized for one week test intervals. At each weekly interval there was a comparison to an untreated control, with a rating after abrasion and after abrasion/washing. Also at each weekly interval there is a data for direct comparisons after abrasion and after abrasion/after washing.

Statistical analysis at a 95% confidence level for each of the test conditions demonstrate that Composition A provided better abrasion resistance on exposed vinyl than ARMOR ALL (Composition B).

TEST 4:

Abrasion resistance of exposed rubber was conducted over a two week exposure period with data summarized at one week intervals. Direct comparison for both abrasion evaluations and abrasion/washing were made.

Statistical analysis at a 95% confidence level of the after abrasion at one week and after two weeks show that Composition A was better than the abrasion resistance of ARMOR ALL. Statistical analysis at a 95% confidence level of the one week, after abrasion/washing data show Composition A and ARMOR ALL to be substantially equal. The statistical analysis at a 95% confidence level of the second week, after abrasion/washing data show that Composition A had better abrasion resistance than ARMOR ALL. These results demonstrate the ability of Composition A to not only provide better initial abrasion resistance than ARMOR ALL but also to provide such protection for a longer period of time.

TEST 5:

Abrasion resistance of unexposed rubber was evaluated after abrasion and with comparison to an untreated control and after abrasion/washing ratings using direct sample comparisons. Statistical analysis at a 95% confidence level demonstrated that Composition A provided better abrasion resistance than ARMOR ALL.

The testing procedures for Test Nos. 1, 2, 3, 4 and 5 and the results supporting the conclusions of such tests are as follows:

II. TEST 1: APPEARANCE TESTING (Exposed Vinyl Panels—60 degree Gloss meter readings)

VINYL PANELS

The vinyl panels were 6"×12" panels composed of 24 gauge cold rolled automotive steel coated with automotive primer and covered with GM WX4HS848 black elk grain, adhesive coated exterior vinyl.

1. The panels are thoroughly cleaned with a commercially available liquid car wash solution prepared following the label directions using a sponge or cloth to wash the panels well followed by a water rinse and drying with a soft cloth.
2. The test panel is treated with approximately 4 ml of the test composition from a syringe to a standard applicator cloth. The standard applicator cloth is 10"×12" cheesecloth folded three times to yield a pad of approximately 5"×3". Each composition is applied three times, evenly to the test panels using the following sequence (except the control panels are not treated except for the initial washing):

a. Apply the test composition, let dry 3 hours, then wipe well to remove excess with a clean dry applicator cloth. The composition is evenly wiped across the surface six times in the same direction using moderate pressure sufficient to remove any excess test composition while turning the cloth at least twice. This procedure is repeated if an excess is still apparent upon visual inspection, but will then be done to all samples in any set of samples, so all samples receive the same amount of surface wiping.

b. Repeat Step a., using fresh cloth (second application).

c. Again repeat Step a., using fresh cloth (third application).

d. The test panels are then evaluated and exposed to outside weathering.
3. a. The following scheme was used for applying the test compositions to the numbered panels:

| Emulsion No. | Panel No. |
| --- | --- |
| Composition A | 1 through 5 |
| Composition B (ARMOR ALL) | 6 through 10 |
| Control (Untreated) | 11 through 15 | b. The treated panels were evaluated in sets of three. Composition A and Composition B and a control panel are assigned to each set and shall remain in the assigned set throughout the evaluation period:

| | |
|---|---|
| Set a. | Panels 1, 6 and 11 |
| Set b. | Panels 2, 7 and 12 |
| Set c. | Panels 3, 8 and 13 |
| Set d. | Panels 4, 9 and 14 |
| Set e. | Panels 5, 10 and 15 |

4. 60 degree gloss meter readings are to be taken using a Hunter Digital Gloss Meter (Model 48-7) prior to outdoor exposure and daily at each evaluation. The readings are recorded for each panel including the untreated (but cleaned) control panels. Three readings are taken on each panel.

5. Outside exposure of vinyl test panels was carried out using a GM Black Box Test for Vinyl Top Material comprising a box (9" (height)×12' (length)×8' (width)) with an open top tilted at a five degree angle to the horizon facing south upon which the vinyl samples are placed.

6. Panels are evaluated daily and gloss readings taken without reapplication or cleaning until the gloss and appearance of the treated panels were not discernibly different from that of the untreated control panels.

7. The data was statistically analyzed as discussed in Example 1 hereof and was as follows:

EXPOSED VINYL PANELS
60 DEGREE GLOSS METER READINGS
INITIAL READINGS BEFORE EXPOSURE [1]

| COMPOSITION A | ARMOR ALL |
|---|---|
| 12.8 | 8.2 |
| 13.2 | 9.7 |
| 16.6 | 10.3 |
| 16.5 | 11.6 |
| 11.9 | 10.5 |

[1] Statistical Analysis:

| $n_a$ | 5 | $n_b$ | 5 |
|---|---|---|---|
| $\epsilon_a$ | 71.00 | $\epsilon_b$ | 50.30 |
| $X_a$ | 14.20 | $X_b$ | 10.06 |
| $S_a$ | 2.1966 | $S_b$ | 1.246 |
| $S_a^2$ | 4.8250 | $S_b^2$ | 1.5530 |

BEFORE EXPOSURE EVALUATIONS [1]

| COMPOSITION A | UNTREATED CONTROL |
|---|---|
| 12.8 | 9.5 |
| 13.2 | 9.4 |
| 16.6 | 9.5 |
| 16.5 | 9.6 |
| 11.9 | 9.4 |

[1] Statistical Analysis:

| $n_a$ | 5 | $n_b$ | 5 |
|---|---|---|---|
| $\epsilon_a$ | 71.00 | $\epsilon_b$ | 47.3 |
| $X_a$ | 14.20 | $X_b$ | 9.46 |
| $S_a$ | 2.1966 | $S_b$ | 0.0548 |
| $S_a^2$ | 4.8250 | $S_b^2$ | 0.0030 |

| ARMOR ALL | UNTREATED CONTROL |
|---|---|
| 8.2 | 9.5 |
| 9.7 | 9.4 |
| 10.3 | 9.5 |
| 11.6 | 9.6 |
| 10.5 | 9.4 |

[1] Statistical Analysis:

| $n_a$ | 5 | $n_b$ | 5 |
|---|---|---|---|
| $\epsilon_a$ | 50.30 | $\epsilon_b$ | 47.3 |
| $X_a$ | 10.06 | $X_b$ | 9.46 |
| $S_a$ | 1.2610 | $S_b$ | 0.0548 |
| $S_a^2$ | 1.5530 | $S_b^2$ | 0.0030 |

FIRST SIX EVALUATIONS OVER 1 WEEK PERIOD [1]

| COMPOSITION A | ARMOR ALL |
|---|---|
| 14.3 | 12.0 |
| 11.9 | 10.8 |
| 14.5 | 11.3 |
| 14.3 | 14.7 |
| 10.7 | 12.3 |
| 11.3 | 10.0 |
| 11.4 | 9.8 |
| 13.8 | 10.5 |
| 12.3 | 13.5 |
| 11.0 | 11.5 |
| 8.2 | 9.4 |
| 13.9 | 8.0 |
| 12.9 | 7.6 |
| 9.8 | 8.8 |
| 15.1 | 10.7 |
| 9.9 | 9.6 |
| 10.6 | 9.7 |
| 10.0 | 8.5 |
| 11.2 | 9.7 |
| 10.3 | 8.4 |
| 12.7 | 7.1 |
| 10.0 | 16.0 |
| 11.4 | 10.4 |
| 10.6 | 8.5 |
| 7.8 | 7.3 |
| 10.2 | 7.8 |
| 7.6 | 8.4 |
| 8.7 | 9.6 |
| 9.8 | 9.2 |
| 7.8 | 7.9 |

[1] Statistical Analysis:

| $n_a$ | 30 | $n_b$ | 30 |
|---|---|---|---|
| $\epsilon_a$ | 334 | $\epsilon_b$ | 299 |
| $X_a$ | 11.13 | $X_a$ | 9.97 |
| $S_a$ | 2.1075 | $S_b$ | 2.1366 |
| $S_a^2$ | 4.4416 | $S^2$ | 4.5650 |

2ND SIX EVALUATION SETS OVER 2ND WEEK PERIOD [1]

| COMPOSITION A | ARMOR ALL |
|---|---|
| 7.8 | 6.3 |
| 8.8 | 6.6 |
| 6.6 | 5.9 |
| 6.2 | 6.8 |
| 6.8 | 6.7 |
| 8.7 | 7.1 |
| 7.1 | 8.2 |
| 5.2 | 6.8 |
| 6.7 | 6.6 |
| 7.4 | 6.7 |
| 6.1 | 5.1 |
| 5.7 | 6.0 |
| 8.0 | 6.0 |
| 5.7 | 7.3 |
| 5.6 | 5.8 |
| 6.2 | 6.7 |
| 7.0 | 6.8 |
| 6.5 | 8.0 |
| 7.3 | 6.0 |
| 6.2 | 6.0 |
| 6.0 | 5.3 |
| 6.4 | 6.3 |
| 6.1 | 7.8 |
| 7.1 | 5.7 |
| 5.8 | 5.6 |
| 6.9 | 6.3 |
| 6.5 | 5.0 |
| 6.9 | 5.2 |
| 5.6 | 5.4 |
| 5.5 | 5.2 |

[1] Statistical Analysis:

| $n_a$ | 30 | $n_b$ | 30 |
|---|---|---|---|
| $\epsilon_a$ | 198.4 | $\epsilon_b$ | 198.0 |
| $X_a$ | 6.613 | $X_a$ | 6.30 |
| $S_a$ | 0.9001 | $S_b$ | 0.8497 |
| $S_a^2$ | 0.8102 | $S_b^2$ | 0.7221 |

3RD EVALUATION SET
5 EVALUATIONS OVER A SIX DAY PERIOD [1]

| COMPOSITION A | ARMOR ALL |
|---|---|
| 5.0 | 6.5 |
| 6.6 | 6.0 |
| 5.8 | 6.5 |
| 6.5 | 7.1 |
| 7.0 | 5.5 |
| 4.9 | 6.0 |

-continued

| | | | |
|---|---|---|---|
| | 5.0 | | 6.0 |
| | 6.4 | | 5.4 |
| | 6.6 | | 7.5 |
| | 5.3 | | 5.5 |
| | 4.8 | | 5.1 |
| | 4.8 | | 5.8 |
| | 6.2 | | 5.0 |
| | 6.5 | | 7.3 |
| | 5.0 | | 5.3 |
| | 3.8 | | 4.3 |
| | 6.0 | | 4.7 |
| | 5.6 | | 5.0 |
| | 5.5 | | 5.3 |
| | 6.4 | | 5.3 |
| | 3.5 | | 3.8 |
| | 6.7 | | 4.6 |
| | 5.4 | | 4.8 |
| | 5.4 | | 5.1 |
| | 6.3 | | 5.4 |

[1] Statistical Analysis:

| | | | |
|---|---|---|---|
| $n_a$ | 25 | $n_b$ | 25 |
| $\epsilon_a$ | 141.0 | $\epsilon_b$ | 138.8 |
| $X_a$ | 5.640 | $X_a$ | 5.5520 |
| $S_a$ | 0.9074 | $S_b$ | 0.9084 |
| $S_a^2$ | 0.8233 | $S_b^2$ | 0.8251 |

AFTER WASHING AT END OF TEST [1]

| COMPOSITION A | | ARMOR ALL | |
|---|---|---|---|
| | 7.0 | | 6.1 |
| | 9.8 | | 9.4 |
| | 6.6 | | 6.1 |
| | 10.3 | | 7.8 |
| | 8.5 | | 7.9 |

[1] Statistical Analysis:

| | | | |
|---|---|---|---|
| $n_a$ | 5 | $n_b$ | 5 |
| $\epsilon_a$ | 42.2 | $\epsilon_b$ | 37.3 |
| $X_a$ | 8.44 | $X_b$ | 7.46 |
| $S_a$ | 1.6410 | $S_b$ | 1.3939 |
| $S_a^2$ | 2.6930 | $S_b^2$ | 1.9430 |

| COMPOSITION A | | UNTREATED CONTROL | |
|---|---|---|---|
| | 7.0 | | 8.2 |
| | 9.8 | | 8.4 |
| | 6.6 | | 8.3 |
| | 10.3 | | 8.2 |
| | 8.5 | | 8.5 |

[1] Statistical Analysis:

| | | | |
|---|---|---|---|
| $n_a$ | 5 | $n_b$ | 5 |
| $\epsilon_a$ | 42.2 | $\epsilon_b$ | 41.6 |
| $X_a$ | 8.44 | $X_b$ | 8.32 |
| $S_a$ | 1.6410 | $S_b$ | 0.1304 |
| $S_a^2$ | 2.6930 | $S_b^2$ | 0.0170 |

| ARMOR ALL | | UNTREATED CONTROL | |
|---|---|---|---|
| | 6.1 | | 8.2 |
| | 9.4 | | 8.4 |
| | 6.1 | | 8.3 |
| | 7.8 | | 8.2 |
| | 7.9 | | 8.5 |

[1] Statistical Analysis:

| | | | |
|---|---|---|---|
| $n_a$ | 5 | $n_b$ | 5 |
| $\epsilon_a$ | 37.3 | $\epsilon_b$ | 41.6 |
| $X_a$ | 7.46 | $X_b$ | 8.32 |
| $S_a$ | 1.3939 | $S_b$ | 0.1304 |
| $S_a^2$ | 1.9430 | $S_b^2$ | 0.0170 |

TEST 2: ABRASION TESTING (Abrasion Resistance Test of Unexposed Vinyl

I. Materials:
1. GM specification grade WN4FB dark claret (maroon) interior vinyl is employed as test strips (9 strips) by cutting strips from the same large piece of vinyl with equivalent orientation.
2. No. 600 grit wet/dry sandpaper (sample supplied).
3. Gardner Straight Line Washability and Abrasion Machine, Model No. MA-1220.
4. A commercially available liquid car wash.

II. Procedure:
1. The abrasion test employs three vinyl strips treated with Composition A, three vinyl strips treated with Composition B and three untreated vinyl strips as the control.
2. The vinyl strips are 4"×18" strips cut to fit the Gardner machine. The strips are to be first washed with a solution of a commercially available liquid car wash, diluted according to label directions, rinsed well with water and then dried. The vinyl strips are then numbered in a manner whereby later identification may be easily made.
3. Using a 5 ml syringe approximately 3 ml of the selected test composition is evenly applied to each vinyl strip.
4. A fresh, new standard applicator cloth is used for each application. The standard applicator cloth is a 10"×12" cheesecloth folded three times to yield a pad of approximately 5"×3". Each test composition is applied three times using the following sequence:
   a. Apply the test composition to a vinyl strip, let dry for 3 hours, then wipe well to remove excess composition from the vinyl strip. Each composition is evenly applied by wiping the applicator across the surface six times in the same direction using moderate pressure sufficient to remove any excess while turning the cloth at least twice. This procedure can be repeated if test composition excess is still visually discernable on the vinyl strip, but any additional wiping must be done to both samples in any set, so all vinyl samples receive the same amount of wiping.
   b. Repeat Step a., using fresh cloth (second application).
   c. Again repeat Step a., using fresh cloth (third application).
5. After application of Composition A or Composition B is complete, each vinyl strip is tested as follows:
   a. Pictures are taken of all vinyl strips to establish controls.
   b. A vinyl test strip is fastened to the Gardner abrasion machine according to the machine's instructions. The No. 600 wet-dry sandpaper is cut into 1½"×7½" strips which are wrapped around a small piece of wood sized to fit into the aperture of the reciprocating boat (weighing approximately 330 grams) of the Gardner machine. The sandpaper/wood assemblage is inserted into the boat leaving a 1½"×3½" area of sandpaper to contact the vinyl surface. A fresh, new strip of sandpaper is used to test each vinyl strip to assure a reproducible, uniform abrasion test for each vinyl strip without cross contamination from one test strip to another test strip.

Each strip is abraded through fifty (or other specified number) of cycles as measured by the Gardner machine cycle counter. The test strips are compared to the untreated control immediately upon completion of the abrasion test. The samples are rated according to a rating scale.

The test strips are washed, rinsed and dried to remove any loose debris due to the abrasion cycles. Again all the test strips are compared to the untreated control and the ratings noted.

6. a. Rating Scale—Comparison to Untreated Control
The rating scale used is as follows:
   0 Extreme abrasion—untreated control
   1 Heavy abrasion 2 Medium abrasion
3 Slight abrasion—easily visible
4 Very minor abrasion
5 No abrasion b. Direct Comparison The two areas treated with Composition A and Composition B are directly compared to each other with the area having the better appearance being rated by assigning to it a 1 or 2, depending on the degree of difference. A rating of 2 is given if there is a very marked difference. A one rating is given when there is an easily discernible difference. A rating of zero is given to both samples if no discernible difference can be observed. The results of this test were as follows:

| ABRASION RESISTANCE OF UNEXPOSED VINYL DIRECT COMPARISON [1] | | | |
|---|---|---|---|
| COMPOSITION A | | ARMOR ALL [1,2] | |
| AFTER ABRASION | | | |
| | 2 | | 0 |
| | 1 | | 0 |
| | 2 | | 0 |
| [1] $n_a$ | 3 | $n_b$ | 3 |
| $\epsilon_a$ | 5 | $\epsilon_b$ | 0 |
| $X_a$ | 1.6667 | $X_b$ | 0 |
| $S_a$ | 0.5774 | $S_b$ | 0 |
| $S_a^2$ | 0.3333 | $S_b^2$ | 0 |
| AFTER WASHING | | | |
| | 1 | | 0 |
| | 1 | | 0 |
| | 1 | | 0 |
| [1] Statistical Analysis: | | | |
| $n_a$ | 3 | $n_b$ | 3 |
| $\epsilon_a$ | 3 | $\epsilon_b$ | 0 |
| $X_a$ | 1 | $X_a$ | 0 |

[2] In direct comparison testing only one product receives a rating. Therefore, the ARMOR ALL product without the rating is considered a zero for statistical analyses values.

TEST 3: ABRASION TESTING (Weathered-Abrasion Resistance Test of Vinyl [Exposed Vinyl])

Materials:
As in Section I of Test 2 Protocol, except that 42 test strips were used.

Procedure:
1. Samples—same as Test 2.
2. Application-see Test 2, above, as to steps 1 to 4. This application procedure will be used to coat 14 strips with Composition A and 14 strips with Composition B. In addition, 14 strips remain as untreated controls samples.
3. Forty two vinyl strips are supplied to run an outdoor exposure test, with daily evaluation. After initial application is complete the samples are left unexposed for 24–48 hours.
4. All samples are then exposed (for 24 to 48 hours) to outdoor weathering by attaching to open-back racks. The racks are facing south at a 45 degree angle from horizontal.
5. A sample set consists of one each of the sample treated with Composition A, one each of the sample treated with Composition B and an untreated control. Each strip is then abraded (as described in Test 2) through 25 cycles as measured by the Gardner machine cycle counter.

Each day three vinyl strips (one set) are removed from the outdoor racks and abrasion tested on the Gardner machine. These samples are thereafter saved and are not returned to outdoor weathering. The following test results were obtained:

| ABRASION RESISTANCE OF EXPOSED VINYL COMPARISON TO AN UNTREATED CONTROL EIGHT DATA SETS OVER FIRST WEEK AFTER ABRASION [1,2] | | | |
|---|---|---|---|
| COMPOSITION A | | ARMOR ALL | |
| 1 | | 1 | |
| 1 | | 0 | |
| 1 | | 0 | |
| 2 | | 0 | |
| 2 | | 0 | |
| 2 | | 1 | |
| 2 | | 1 | |
| 0 | | 0 | |
| [1] Statistical Analysis: | | | |
| $n_a$ | 8 | $n_b$ | 8 |
| $\epsilon_a$ | 5 | $\epsilon_b$ | 3 |
| $X_a$ | 1.3750 | $X_b$ | 0.3750 |
| $S_a$ | 0.7440 | $S_b$ | 0.5175 |
| $S_a^2$ | 0.5536 | $S_b^2$ | 0.2679 |

[2] The untreated control appearance is pegged at zero and a scale of 0 to 5 is used to define relative performance as described in the protocol for these tests.

| SEVEN DATA SETS OVER 2ND WEEK PERIOD AFTER ABRASION [1] | | | |
|---|---|---|---|
| COMPOSITION A | | ARMOR ALL | |
| 0 | | 0 | |
| 1 | | 0 | |
| 1 | | 0 | |
| 1 | | 0 | |
| 1 | | 0 | |
| 0 | | 0 | |
| 0 | | 0 | |
| [1] Statistical Analysis: | | | |
| $n_a$ | 7 | $n_b$ | 7 |
| $\epsilon_a$ | 4 | $\epsilon_b$ | 0 |
| $X_a$ | 0.5714 | $X_b$ | 0 |
| $S_a$ | 0.5345 | $S_b$ | 0 |
| $S_a^2$ | 0.2857 | $S_b^2$ | 0 |

| EIGHT DATA SETS OVER FIRST WEEK AFTER ABRASION AND AFTER WASHING [1] | | | |
|---|---|---|---|
| COMPOSITION A | | ARMOR ALL | |
| 3 | | 2 | |
| 2 | | 0 | |
| 1 | | 0 | |
| 2 | | 0 | |
| 2 | | 0 | |
| 2 | | 0 | |
| 2 | | 0 | |
| 1 | | 0 | |
| [1] Statistical Analysis: | | | |
| $n_a$ | 8 | $n_b$ | 8 |
| $\epsilon_a$ | 15 | $\epsilon_b$ | 2 |
| $X_a$ | 0.8750 | $X_b$ | 0.2500 |
| $S_a$ | 0.6409 | $S_b$ | 0.7071 |
| $S_a^2$ | 0.4107 | $S_b^2$ | 0.5000 |

| SEVEN DATA SETS OVER 2ND WEEK PERIOD AFTER ABRASION AND AFTER WASHING [1] | | | |
|---|---|---|---|
| COMPOSITION A | | ARMOR ALL | |
| 1 | | 0 | |
| 1 | | 0 | |
| 2 | | 0 | |
| 1 | | 0 | |
| 2 | | 1 | |
| 2 | | 0 | |
| 2 | | 0 | |
| 1 | | 0 | |
| [1] Statistical Analysis: | | | |
| $n_a$ | 7 | $n_b$ | 7 |
| $\epsilon_a$ | 11 | $\epsilon_b$ | 1 |
| $X_a$ | 1.5714 | $X_b$ | 0.1429 |
| $S_a$ | 0.5345 | $S_b$ | 0.3780 |
| $S_a^2$ | 0.2857 | $S_b^2$ | 0.1429 |

-continued

ABRASION RESISTANCE OF EXPOSED VINYL
DIRECT COMPARISON RATING [1,2]
EIGHT DATA SETS OVER FIRST WEEK AFTER ABRASION

| COMPOSITION A | ARMOR ALL |
|---|---|
| 1 | 0 |
| 2 | 0 |
| 2 | 0 |
| 2 | 0 |
| 2 | 0 |
| 1 | 0 |
| 2 | 0 |
| 1 | 0 |

[1] Statistical Analysis:

| | | | |
|---|---|---|---|
| $n_a$ | 8 | $n_b$ | 8 |
| $\epsilon_a$ | 13 | $\epsilon_b$ | 0 |
| $X_a$ | 1.6250 | $X_b$ | 0 |
| $S_a$ | 0.5175 | $S_b$ | 0 |
| $S_a^2$ | 0.2678 | $S_b^2$ | 0 |

[2] Direct comparison rating-only one product receives a value of 1 or 2 and the other is zero. If both are equal, they are both rated zero. Rating scale details are described in the protocol for these tests.

SEVEN DATA SETS OVER 2ND WEEK PERIOD AFTER ABRASION [1]

| COMPOSITION A | ARMOR ALL |
|---|---|
| 2 | 0 |
| 1 | 0 |
| 1 | 0 |
| 1 | 0 |
| 1 | 0 |
| 1 | 0 |
| 1 | 0 |

[1] Statistical Analysis:

| | | | |
|---|---|---|---|
| $n_a$ | 7 | $n_b$ | 7 |
| $\epsilon_a$ | 8 | $\epsilon_b$ | 0 |
| $X_a$ | 1.1429 | $X_b$ | 0 |
| $S_a$ | 0.3780 | $S_b$ | 0 |
| $S_a^2$ | 0.1429 | $S_b^2$ | 0 |

EIGHT DATA SETS OVER FIRST WEEK PERIOD AFTER ABRASION AND AFTER WASHING [1]

| COMPOSITION A | ARMOR ALL |
|---|---|
| 1 | 0 |
| 2 | 0 |
| 2 | 0 |
| 2 | 0 |
| 1 | 0 |
| 0 | 0 |
| 2 | 0 |
| 1 | 0 |

[1] Statistical Analysis:

| | | | |
|---|---|---|---|
| $n_a$ | 8 | $n_b$ | 8 |
| $\epsilon_a$ | 11 | $\epsilon_b$ | 0 |
| $X_a$ | 1.3750 | $X_b$ | 0 |
| $S_a$ | 0.7440 | $S_b$ | 0 |
| $S_a^2$ | 0.5536 | $S_b^2$ | 0 |

SEVEN DATA SETS OVER 2ND WEEK PERIOD AFTER ABRASION AND AFTER WASHING [1]

| COMPOSITION A | ARMOR ALL |
|---|---|
| 2 | 0 |
| 0 | 0 |
| 0 | 0 |
| 1 | 0 |
| 1 | 0 |
| 1 | 0 |
| 1 | 0 |

[1] Statistical Analysis:

| | | | |
|---|---|---|---|
| $n_a$ | 7 | $n_b$ | 7 |
| $\epsilon_a$ | 6 | $\epsilon_b$ | 0 |
| $X_a$ | 1.8571 | $X_b$ | 0 |
| $S_a$ | 0.6901 | $S_b$ | 0 |
| $S_a^2$ | 0.4762 | $S_b^2$ | 0 |

TEST 4: ABRASION TESTING (Weathered-Abrasion Resistance Test of Rubber (Exposed Rubber))

Materials:
Forty two (42) synthetic rubber strips.

Procedure:
1. Samples—prepared as in Test 3.
2. Application—Test 2 procedure employed. This application procedure is used to treat 14 strips with Composition A and 14 strips with Composition B. In addition 14 strips remain as untreated controls.
3. Forty two rubber strips are supplied to run an exposure test, with daily evaluation.
4. After application, all samples were exposed to outdoor weathering by attaching to open-back racks. The racks are facing south at a 45 degree angle from horizontal.
5. A sample set consists of one each of the sample treated with Composition A, one each sample treated with Composition B and an untreated control. Each strip is abraded through cycles as measured by the Gardner machine cycle counter (the procedure as per Test 2).

Each day three rubber strips (one set) are removed from the outdoor racks and abrasion tested on the Gardner machine. These are thereafter saved and not returned to outdoor weathering.

ABRASION RESISTANCE OF EXPOSED RUBBER
DIRECT COMPARISON RATING [1,2]
SEVEN DATA SETS FIRST WEEK AFTER ABRASION

| COMPOSITION A | ARMOR ALL |
|---|---|
| 1 | 0 |
| 2 | 0 |
| 2 | 0 |
| 2 | 0 |
| 2 | 0 |
| 2 | 0 |
| 2 | 0 |

[1] Statistical Analysis:

| | | | |
|---|---|---|---|
| $n_a$ | 7 | $n_b$ | 7 |
| $\epsilon_a$ | 13 | $\epsilon_b$ | 0 |
| $X_a$ | 1.8571 | $X_b$ | 0 |
| $S_a$ | 0.3780 | $S_b$ | 0 |
| $S_a^2$ | 0.1429 | $S_b^2$ | 0 |

[2] Direct comparison rating-only one product receives a value of 1 or 2 and the other is zero. If both are equal, they are both rated zero. Rating scale details are described in the protocol for these tests.

ABRASION RESISTANCE OF EXPOSED RUBBER
DIRECT COMPARISON RATINGS
SEVEN DATA SETS 2ND WEEK AFTER ABRASION [1]

| COMPOSITION A | ARMOR ALL |
|---|---|
| 2 | 0 |
| 2 | 0 |
| 2 | 0 |
| 2 | 0 |
| 2 | 0 |
| 2 | 0 |
| 2 | 0 |

[1] Statistical Analysis:

| | | | |
|---|---|---|---|
| $n_a$ | 7 | $n_b$ | 7 |
| $\epsilon_a$ | 14 | $\epsilon_b$ | 0 |
| $X_a$ | 2 | $X_b$ | 0 |

SEVEN DATA SETS OF THREE, FIRST WEEK AFTER ABRASION AND AFTER WASHING [1,2]

| COMPOSITION A | ARMOR ALL |
|---|---|
| 1 | 0 |
| 0 | 1 |
| 0 | 0 |
| 0 | 0 |

-continued

| | |
|---|---|
| 0 | 0 |
| 0 | 0 |
| 0 | 0 |
| 0 | 0 |
| 1 | 0 |
| 0 | 0 |
| 0 | 1 |
| 0 | 0 |
| 1 | 0 |
| 0 | 0 |
| 0 | 0 |
| 0 | 0 |
| 1 | 0 |

[1] Statistical Analysis:

| | | | |
|---|---|---|---|
| $n_a$ | 21 | $n_b$ | 21 |
| $\epsilon_a$ | 8 | $\epsilon_b$ | 6 |
| $X_a$ | 0.3810 | $X_b$ | 0.2857 |
| $S_a$ | 0.4976 | $S_b$ | 0.4629 |
| $S_a^2$ | 0.2476 | $S_b^2$ | 0.2143 |

[2] Evaluations made by three independent observers per day.

SEVEN DATA SETS OF THREE, 2ND WEEK
AFTER ABRASION AND AFTER WASHING [1]

| COMPOSITION A | ARMOR ALL |
|---|---|
| 0 | 0 |
| 1 | 0 |
| 1 | 0 |
| 1 | 0 |
| 1 | 0 |
| 0 | 1 |
| 1 | 0 |
| 1 | 0 |
| 1 | 0 |
| 2 | 0 |
| 1 | 0 |
| 0 | |
| 0 | 0 |
| 1 | 0 |
| 1 | 0 |
| 0 | 0 |
| 2 | 0 |
| 1 | 0 |
| 0 | 0 |
| 1 | 0 |
| 1 | 0 |

[1] Statistical Analysis:

| | | | |
|---|---|---|---|
| $n_a$ | 21 | $n_b$ | 21 |
| $\epsilon_a$ | 17 | $\epsilon_b$ | 2 |
| $X_a$ | 0.8095 | $X_b$ | 0.0952 |
| $S_a$ | 0.6016 | $S_b$ | 0.3008 |
| $S_a^2$ | 0.3619 | $S_b^2$ | 0.0905 |

TEST 5: ABRASION TESTING (Abrasion Resistance Test of Unexposed Rubber Strips)

I. Materials:

1. Hi-Grade black neoprene rubber meeting ASTM-D-2000-75 Type BC having a hardness of shore A durometer-35-45A soft, ⅛" thick.
2. No. 600 grit wet/dry sandpaper.
3. Gardner Straight Line Washability and Abrasion Machine, Model No. MA-1220.
4. Commonly available commercial liquid car wash.

II. Procedure:

1. The test consists of three rubber strips treated with Composition A, three treated with Composition B and three untreated controls.
2. The rubber strips are 4"×18" strips to fit the Gardner machine. The strips are first washed with a solution of commercially available liquid car wash diluted according to label directions, rinsed well with water and then dried. The rubber strips are then numbered in a manner whereby later identification can be easily made.
3. Using a 5 ml syringe, approximately 3 ml of a test composition is applied to each rubber strip sample.
4. A fresh, new standard applicator cloth is used for each application. The standard applicator cloth is a 10"×12" cheesecloth folded three times to yield a pad of approximately 5"×3". Each test composition is applied three times to a rubber test strip using the following sequence:
   a. Apply the test composition, let it dry for a selected period of 3 to 24 hours, then wipe well to remove excess with a clean dry cloth. The wipe procedure uses a single fresh applicator cloth. The sample is evenly wiped across the surface six times in the same direction using moderate pressure sufficient to remove any excess, turning the cloth at least twice. This procedure can be repeated if an excess is still visually observable, but must be repeated for all treated samples in any set, so that all samples receive the same amount of surface wiping.
   b. Repeat Step a., using a fresh cloth (second application).
   c. Again repeat Step a., using a fresh cloth (third application).
5. After application is complete, abrasion testing is conducted as described above in Test 2.
6. The data is then statistically analyzed. The following results were obtained:

| COMPOSITION A | ARMOR ALL |
|---|---|
| ABRASION RESISTANCE OF UNEXPOSED RUBBER COMPARED TO AN UNTREATED CONTROL AFTER ABRASION [1] | |
| 2 | 1 |
| 2 | 1 |
| 2 | 1 |

[1] Statistical Analysis:

| | | | |
|---|---|---|---|
| $n_a$ | 3 | $n_b$ | 3 |
| $\epsilon_a$ | 6 | $\epsilon_b$ | 3 |
| $X_a$ | 2 | $X_b$ | 1 |

ABRASION RESISTANCE OF UNEXPOSED RUBBER
DIRECT COMPARISON AFTER ABRASION [1]

| | |
|---|---|
| 1 | 0 |
| 1 | 0 |
| 1 | 0 |

[1] Statistical Analysis:

| | | | |
|---|---|---|---|
| $n_a$ | 3 | $n_b$ | 3 |
| $\epsilon_a$ | 3 | $\epsilon_b$ | 0 |
| $X_a$ | 1 | $X_b$ | 0 |

EXAMPLE 3: DATA SUMMARY

| TEST NO. | TREATED SUBSTRATE | TEST | TEST EVALUATION | TEST TYPE[1] | DATA | STAT. ANAL. AT 95% CONF. LEVEL |
|---|---|---|---|---|---|---|
| 1 | Black ext. Vinyl | Exposed GM Black Box Test | Daily/3 weeks | Appearance | 60° Gloss Meter Read. | Composition A Better than ARMOR ALL |
| 2 | Maroon ext. Vinyl | Unexposed | 3 Hrs after last Application | Abrasion Resistance | Comparison to Untreated Control & | Composition A Better than ARMOR ALL |

EXAMPLE 3: DATA SUMMARY -continued

| TEST NO. | TREATED SUBSTRATE | TEST | TEST EVALUATION | TEST TYPE[1] | DATA | STAT. ANAL. AT 95% CONF. LEVEL |
|---|---|---|---|---|---|---|
| 3 | Maroon int. Vinyl | Exposed | Daily/2 weeks | Abrasion Resistance | Direct Compar. Ratings Comparison to Untreated Control & Direct Compar. Ratings | Composition A Better than ARMOR ALL |
| 4 | Rubber | Exposed | Daily/2 weeks | Abrasion Resistance | Direct Comparison Ratings | Composition A Better than ARMOR ALL |
| 5 | Rubber | Unexposed | 3 Hrs. after last Application | Abrasion Resistance | Comparison to Untreated Control & Direct Compar. Ratings | Composition A Better than ARMOR ALL |

[1]Test Type = Appearance measured by Gloss Meter readings which show whether product had a higher gloss, i.e., better appearance.
Abrasion Resistance = Gardner testing showed if product gave better resistance to abrasion.

EXAMPLE 3:

(a) The test procedure for evaluating surface abrasion of treated vinyl panels (General Motor's specification grade maroon interior vinyl) was carried out according to the procedure of Example 2, Test 2, using the following compositions:

| Test Composition No. | Composition |
|---|---|
| 1 | ARMOR ALL |
| 2 | TURTLE CLEAR GUARD |
| 3 | COMPOSITION A |
| 4 | NU VINYL |
| 5 | COMPOSITION C* |
| 6 | RAINDANCE PROTECTANT |

*Composition C is a commercially available protestant containing:
about 75 wt % water
about 20 wt % dimethylpolysiloxane (provided as an emulsion [60 wt. % dimethylpolysiloxane])
about 5 wt % propylene glycol After abrasion testing using a Gardner Straight Line Washability and Abrasion Machine, the following relative ratings were obtained:

| Product Tested | Product Rating[1,2] | Product Rating[1,3] |
|---|---|---|
| ARMOR ALL | 3 | 3 |
| TURTLE CLEAR GUARD | 2 | 1 |
| COMPOSITION A | 5 | 5 |
| NU VINYL | 2 | 2 |
| COMPOSITION C | 3 | 3 |
| RAINDANCE PROTECTANT | 3 | 3 |
| CONTROL (UNTREATED) | 0 | 0 |

[1]Ratings are:
0 = Extreme Abrasion (Untreated Control)
1 = Heavy Abrasion
2 = Medium Abrasion
3 = Slight Abrasion
4 = Minor Abrasion
5 = No Abrasion
[2]Ratings after excess being wiped after 2.5 hours.
[3]Ratings after excess being wiped after setting overnight.

The above procedure was again followed except the treated vinyl strips were given two applications of the selected compositions by wiping excess composition from each vinyl strip after 2.5 hours and then applying a treatment with the composition and permitting such to set overnight before the excess composition from the second application is wiped from treated surface. The abrasion testing for each strip having two treatments is then conducted as discussed above. Each of the above compositions received the following ratings (as defined above):

| Product | Rating |
|---|---|
| ARMOR ALL | 2 |
| TURTLE CLEAR GUARD | 1 |
| COMPOSITION A | 5 |
| COMPOSITION C | 3 |
| RAINDANCE PROTECTANT | 2 |
| CONTROL (UNTREATED) | 0 |

(b) The general test procedure of part (a) for abrasion testing was employed to evaluate the retained gloss of General Motor's specification grade maroon interior vinyl after a specified number of washing cycles using a Gardner Straight Line Washability and Abrasion Machine. In this test, cellulose sponge for washing is substituted for the sandpaper and a commercially available car wash concentrate is diluted on the basis of one ounce per gallon of water. The cellulose sponge is 3.25 inch × 1.125 inch × 1.25 inch and weighed about 8.92 grams. The cellulose sponge was affixed to the 330 gram boat in place of the sandpaper described in the abrasion resistance testing. Fifteen (15) mililiters of the diluted commercial car wash was applied to the sponge before the selected number of washing cycles is commenced. After the washing cycles are completed the panel is rinsed with water and evaluated. A total of sixteen (16) panels were evaluated for three different compositions with the evaluation of a panel being reported as either "GR" for "Gloss Retained" or "GL" for Gloss Lost". The results were as follows:

| Washing Cycles | Composition Tested | | |
|---|---|---|---|
| | ARMOR ALL | Composition A | Composition C |
| 5 | GL | GR[1] | GL |
| 10 | GL[1] | GR[2] | GL[1] |
| 25 | GL | GR[1] | GL |

[1]Average of two tests.
[2]Average of four tests.

What is claimed:
1. A composition for treating a surface comprising:
(i) between about 20 and about 40 weight percent water;

(ii) between about 50 and about 60 weight percent silicone emulsion containing about 20 to about 40 weight percent dialkylpolysiloxane;

(iii) between about 0.5 and about 5 weight percent aminofunctional silicone emulsion containing 20 to 40 weight percent aminofunctional polysiloxane;

(iv) between about 2 and about 8 weight percent of a polyol;

(v) between about 1 and about 5 weight percent acrylic copolymer emulsion containing between about 20 and about 40 weight percent acrylic copolymer and between about 0.1 and about 1 weight percent morpholine;

(vi) between about 0.01 and about 1 weight percent of a bactericide; and wherein said weight percents are based upon the total weight of the composition.

2. A composition according to claim 1 wherein said surface is selected from the group consisting of rubber and polymeric materials.

3. A composition according to claim 2 or claim 1 wherein said rubber is selected from the group consisting of natural rubber and synthetic rubber.

4. A composition according to claim 2 or claim 3 wherein said polymeric materials are vinyl polymeric materials.

5. A composition for treating a rubber or a vinyl polymer surface wherein said composition comprises:

(i) between about 30 and about 35 weight percent water;

(ii) between about 55 and about 60 weight percent silicone emulsion containing about 35 weight percent dialkylpolysiloxane;

(iii) between about 1.0 and 2.0 weight percent aminofunctional silicone emulsion containing about 35 weight percent aminodimethylpolysiloxane;

(iv) between about 3 and about 7 weight percent propylene glycol;

(v) between about 2 and about 4 weight percent acrylic copolymer emulsion containing between about 25 and about 35 ,weight percent acrylic copolymer and between about 0.3 and about 0.5 weight percent morpholine; and (vi) between about 0.1 and about 0.3 of a mixture of 16 weight percent water, 19 weight percent 1,2 benziosothiazolin 3-one and 65 weight percent dipropylene glycol; and wherein said weight percents are based upon the total weight of the composition.

6. A composition according to claim 1 or claim 5 wherein said pH of said composition is between about 6.5 and about 9.0.

7. A composition according to claim 6 wherein said pH of said composition is between about 7.5 and about 8.5.

8. A composition according to claim 1 wherein an antibactericide agent to inhibit the attack of bacteria is present in an effective amount.

9. A composition according to 1 wherein said silicone fluid is a dimethylpolysiloxane and said aminofunctional silicone fluid is an aminofunctional dimethylpolysiloxane.

10. A process for treating a surface comprising:

(i) wetting said surface with a composition selected from the group of compositions as set forth in claim 1;

(ii) allowing said composition to penetrate said surface for an effective period of time:

(iii) lightly wiping said surface after said effective period of time.

11. A process according to claim 10 wherein said steps (i), (ii) and (iii) are carried out a second time.

12. A process according to claim 11 wherein said steps (i), (ii) and (iii) are carried out a third time.

13. A process according to claim 10 wherein said composition is as set forth in claim 2.

14. A process according to claim 10 wherein said composition is as set forth in claim 2.

15. A process according to claim 10 wherein said composition has a viscosity between about 8000 centipoise and about 12,000 centipoise.

16. A process according to claim 15 wherein said pH of said composition is between about 6.5 and about 9.0.

17. A process according to claim 10 wherein said effective period of time is up to 24 hours.

18. A process according to claim 17 wherein said effective period of time is less than 2 hours.

19. A composition according to claim 5 wherein said surface is selected from the group consisting of rubber and polymeric materials.

20. A process according to claim 10 wherein said composition is as set forth in claim 3.

21. A composition for treating rubber and polymeric material consisting essentially of:

(i) between about 20 and about 40 weight percent water;

(ii) between about 50 and about 60 weight percent silicone emulsion containing about 20 to about 40 weight percent dimethylpolysiloxane;

(iii) between about 0.5 and about 5 weight percent aminofunctional silicone emulsion containing 20 to 40 weight percent aminofunctional polysiloxane;

(iv) between about 2 and about 8 weight percent of a polyol, preferably propylene glycol;

(v) between about 1 and about 5 weight percent acrylic copolymer emulsion containing between about 20 and about 40 weight percent acrylic copolymer and between about 0.1 and about 1 weight percent morpholine;

(vi) between about 0.01 and about 1 weight percent of a mixture of water, 1, 2 benziosothiazolin 3-one and dipropylene glycol wherein the weight ratio of 1, 2 benziosothiazolin 3-one to dipropylene glycol is between about 1:10 and about 10:1; and wherein said weight percents are based upon the total weight of the composition.

* * * * *